(12) United States Patent
Arbel et al.

(10) Patent No.: US 11,709,624 B2
(45) Date of Patent: Jul. 25, 2023

(54) SYSTEM-ON-CHIP HAVING MULTIPLE CIRCUITS AND MEMORY CONTROLLER IN SEPARATE AND INDEPENDENT POWER DOMAINS

(71) Applicant: Xilinx, Inc., San Jose, CA (US)

(72) Inventors: Ygal Arbel, Morgan Hill, CA (US); Ian A. Swarbrick, Santa Clara, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 807 days.

(21) Appl. No.: 15/898,183

(22) Filed: Feb. 15, 2018

(65) Prior Publication Data

US 2019/0250853 A1    Aug. 15, 2019

(51) Int. Cl.
*G06F 3/06*      (2006.01)
*G06F 13/40*      (2006.01)
*G06F 1/28*      (2006.01)
*G06F 1/3287*      (2019.01)

(52) U.S. Cl.
CPC .............. *G06F 3/0659* (2013.01); *G06F 1/28* (2013.01); *G06F 1/3287* (2013.01); *G06F 3/0604* (2013.01); *G06F 3/0634* (2013.01); *G06F 3/0679* (2013.01); *G06F 13/4022* (2013.01); *G06F 2213/0038* (2013.01)

(58) Field of Classification Search
None
See application file for complete search history.

(56) References Cited

U.S. PATENT DOCUMENTS

| | | | |
|---|---|---|---|
| 7,185,309 B1 | 2/2007 | Kulkarni et al. | |
| 7,574,680 B1 | 8/2009 | Kulkarni et al. | |
| 7,650,248 B1 | 1/2010 | Baxter | |
| 7,831,801 B1 | 11/2010 | Anderson | |
| 8,020,163 B2 | 9/2011 | Nollet et al. | |
| 8,612,789 B2 | 12/2013 | Taylor et al. | |
| 8,667,192 B2 | 3/2014 | Mlaire et al. | |
| 2008/0320254 A1 | 12/2008 | Wingard et al. | |
| 2010/0005328 A1* | 1/2010 | Rakshani | G06F 1/3203 713/322 |
| 2013/0073878 A1 | 3/2013 | Jayasimha et al. | |

(Continued)

FOREIGN PATENT DOCUMENTS

| | | |
|---|---|---|
| JP | 2009187552 A | 8/2009 |
| JP | 201274042 A | 4/2012 |
| JP | 2016509261 A | 3/2016 |

(Continued)

*Primary Examiner* — Rocio Del Mar Perez-Velez
*Assistant Examiner* — Marwan Ayash
(74) *Attorney, Agent, or Firm* — Patterson + Sheridan, LLP

(57) ABSTRACT

Examples of the present disclosure generally relate to integrated circuits, such as a system-on-chip (SoC), that include a memory subsystem. In some examples, an integrated circuit includes a first master circuit in a first power domain on a chip; a second master circuit in a second power domain on the chip; and a first memory controller in a third power domain on the chip. The first master circuit and the second master circuit each are configured to access memory via the first memory controller. The first power domain and the second power domain each are separate and independent from the third power domain.

12 Claims, 4 Drawing Sheets

(56) References Cited

U.S. PATENT DOCUMENTS

2014/0089688 A1* 3/2014 Man ............... G06F 1/3206
  713/300
2014/0325247 A1 10/2014 Sodhi et al.

FOREIGN PATENT DOCUMENTS

| JP | 2017517810 A | 6/2017 |
| WO | 2017105727 A1 | 6/2017 |

* cited by examiner

US 11,709,624 B2

SYSTEM-ON-CHIP HAVING MULTIPLE CIRCUITS AND MEMORY CONTROLLER IN SEPARATE AND INDEPENDENT POWER DOMAINS

TECHNICAL FIELD

Examples of the present disclosure generally relate to a system-on-chip (SoC) and, in particular, to a SoC that includes a memory subsystem that includes one or more memory controllers.

BACKGROUND

Advances in integrated circuit technology have made it possible to embed an entire system, such as including a processor core, a memory controller, and a bus, in a single semiconductor chip. This type of chip is commonly referred to as a system-on-chip (SoC). Other SoCs can have different components embedded therein for different applications. The SoC provides many advantages over traditional processor-based designs. It is an attractive alternative to multi-chip designs because the integration of components into a single device increases overall speed while decreasing size. The SoC is also an attractive alternative to fully customized chips, such as an ASIC (application specific integrated circuit), because ASIC designs tend to have a significantly longer development time and larger development costs. A configurable SoC (CSoC), which includes programmable logic, has been developed to implement a programmable semiconductor chip that can obtain benefits of both programmable logic and SoC.

SUMMARY

Examples of the present disclosure generally relate to integrated circuits, such as a system-on-chip (SoC), that include a memory subsystem. Various examples can permit operating a memory controller independently of master circuits of the integrated circuit, and can permit a scalable, unified memory subsystem.

An example of the present disclosure is an integrated circuit. The integrated circuit includes a first master circuit in a first power domain on a chip; a second master circuit in a second power domain on the chip; and a first memory controller in a third power domain on the chip. The first master circuit and the second master circuit each are configured to access memory via the first memory controller. The first power domain and the second power domain each are separate and independent from the third power domain.

Another example of the present disclosure is a method of operating an integrated circuit. Each of a plurality of master circuits of the integrated circuit is selectively entered into one of a plurality of power modes. Memory is accessed by at least one of the plurality of master circuits via a first memory controller of the integrated circuit irrespective of the selected one of the plurality of power modes of each of the others of the plurality of master circuits. The first memory controller is in a power domain separate from each respective power domain of the plurality of master circuits.

Yet another example of the present disclosure is an integrated circuit. The integrated circuit includes a processing system on a chip; programmable logic on the chip; a configurable interconnect network on the chip; a first memory controller on the chip; and a management unit on the chip. The processing system and the programmable logic each are communicatively coupled to the first memory controller via the configurable interconnect network. The processing system and the programmable logic each are configured to access memory via the first memory controller and the configurable interconnect network. The management unit is capable of controlling respective power modes of the processing system and the programmable logic independently of operation of the first memory controller.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only example implementations and are therefore not to be considered limiting of the scope of other implementations.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
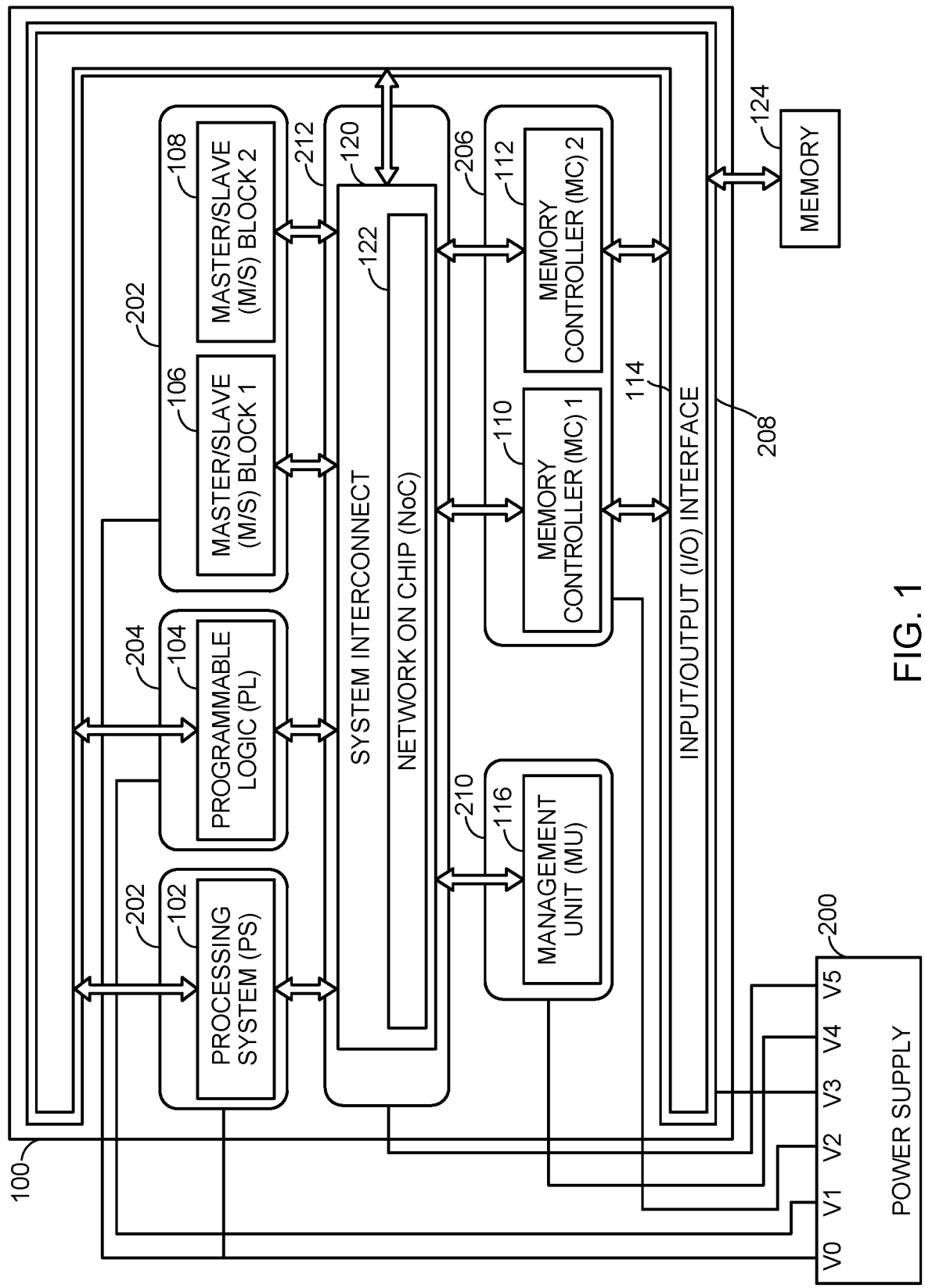
FIG. 1 is a block diagram of an integrated circuit (IC), in accordance with some examples of the present disclosure.

Examples of the present disclosure provide integrated circuits, such as a system-on-chip (SoC), that include a memory subsystem. Generally, in some examples, the memory subsystem includes one or more memory controllers that are in a power domain separate and independent from power domains of master modules. Hence, each master module can access memory via a memory controller without regard to the power modes of other master modules, since the operation of the memory controller is independent and separate from the power modes of each of the master modules. Further, the memory controllers can be implemented in an IC with an interconnect structure, such as a programmable network-on-chip (NoC), in the IC. The memory controller and interconnect structure can provide a scalable and unified scheme that permits master modules access to memory.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of different embodiments or as a limitation on the scope of the claims. In addition, an illustrated example need not have all the aspects or advantages shown. An aspect or an advantage described in conjunction with a particular example is not necessarily limited to that example and can be practiced in any other examples, even if not so illustrated or if not so explicitly described.

FIG. 1 is a block diagram of an integrated circuit (IC) 100, in accordance with some examples of the present disclosure. In some examples, the IC 100 may be a programmable IC, such as a field programmable gate array (FPGA), a programmable logic device (PLD), and the like. In other examples, the IC 100 may be an application specific IC (ASIC) or another IC. The IC 100 may be a system-on-chip (SoC) and may be implemented on a single die. The IC 100 includes a processing system (PS) 102, programmable logic (PL) 104, a master and/or slave (M/S) block 1 106, a M/S block 2 108, a memory controller (MC) 1 110, a MC 2 112, an input/output (I/O) interface 114, a management unit (MU) 116, and a system interconnect 120. The system interconnect 120 further includes a network-on-chip (NoC) 122. These blocks and subsystems are examples. The IC 100 can include any combination of these, additional, and/or different blocks and subsystems.

The PS 102 can be or include one or more processor cores. For example, the PS 102 can include a number of ARM-based embedded processor cores. The PL 104 can include any number of configurable logic blocks (CLBs), which may be programmed or configured using the PS 102. The M/S block 1 106 and M/S block 2 108 may be any of a number of blocks and subsystems. For example, the M/S block 1 106 and M/S block 2 108 each could be programmable logic, a processing system (such as a digital signal processor (DSP), graphical processor unit (GPU), or the like), a video compression unit (VCU), an accelerator, memory, or other blocks and/or subsystems.

The MC 1 110 and MC 2 112 are memory controllers that are configured to control access to memory by a master module, such as the PS 102, PL 104, or another module. In some examples, the MC 1 110 and MC 2 112 each can be a double data rate fourth-generation (DDR4) MC, a high bandwidth memory second-generation (HBM2) MC, or another MC. In other examples, the MC 1 110 and MC 2 112 can be any generation technology and/or any standard or non-standard MC. In a specific example, the MC 1 110 and MC 2 112 each are a DDR4 MC. Each of the MC 1 110 and MC 2 112 can have end-to-end data protection, such as generation and checking of parity bits and/or error correction codes, data poisoning support to indicate uncorrectable errors, and/or error logging and reporting.

The I/O interface 114 can be configured to permit communication between the IC 100 and another component off-chip. The I/O interface 114 can be configured for any standard and/or proprietary communications. The I/O interface 114 can be communicatively coupled to any modules on the IC 100. Some modules may be directly communicatively coupled to the I/O interface 114, while other modules may be indirectly communicatively coupled to the I/O interface 114, such as through another module like the NoC 122. As illustrated, the PS 102, PL 104, MC 1 110, and MC 2 112 are directly communicatively coupled to the I/O interface 114 (e.g., without the system interconnect 120 intervening), and further, the system interconnect 120 is communicatively coupled to the I/O interface 114. Further, as illustrated, the I/O interface 114 is communicatively coupled to off-chip memory 124. The off-chip memory 124 can be or include, for example, dynamic random access memory (DRAM), flash memory, or other memory. The off-chip memory 124 can be attached to a same interposer and/or package substrate as the IC 100, which interposer and/or package substrate can communicatively couple the off-chip memory 124 to the IC 100, for example. Additional and/or different components may be coupled to the IC 100 using the I/O interface 114. Various modules on the IC 100 may be communicatively coupled to various components off-chip from the IC 100 via the I/O interface 114, and further, possibly via the system interconnect 120.

The MU 116 is configured to control various aspects of the IC 100. The MU 116 can, alone or in coordination with one or more other components, initiate and configure the IC 100, debug operations of the IC 100, control powering on of the IC 100, and control power management within the IC 100. Additional detail of the power management by the MU 116 is described below.

The system interconnect 120 can communicatively connect various ones of the modules of the IC 100. As previously stated, the system interconnect 120 includes the NoC 122. The NoC 122 includes communication paths interconnected by configurable switches. The configurable switches allow the communication paths to be selectively programed or configured to communicatively couple different modules of the IC 100. By permitting the switches to be configured or programmed, the NoC 122 can permit efficient use of resources based on a configuration of, e.g., the PL 104 without necessarily having to dedicate resources in the PL 104 for interconnections and/or without necessarily having to dedicate non-configurable interconnections between modules. The NoC 122 can further include an interconnect implemented for configuring the switches of the NoC 122, which interconnect may be referred to as a NoC peripheral interconnect (NPI). The system interconnect 120 may further include non-configurable interconnects, which may enable communication during booting sequences and/or for power management.

Various modules of the IC 100 are in different power domains. For example, the PS 102 is in a first power domain 202. The PL 104 is in a second power domain 204. The MC 1 110 and MC 2 112 are in one or more third power domain 206. The I/O interface 114 can be in a fourth power domain 208, and the MU 116 can be in a fifth power domain 210. The system interconnect 120 can be in a sixth power domain 212. The M/S Block 1 106 and M/S Block 2 108 can be in one or more additional power domains or in the first, second, third, fourth, or fifth power domain 202, 204, 206, 208, or 210. As illustrated, the M/S Block 1 106 and M/S Block 2 108 are in the first power domain 202. Although the example in FIG. 1 illustrates some blocks or modules as sharing a power domain (e.g., PS 102, M/S Block 1 106, and M/S Block 2 108 sharing the first power domain 202, and MC 1 110 and MC 2 112 sharing the third power domain 206), each block or module may be a separate physical block and may be in a separate power domain, e.g., operated independently of the power state of other blocks or modules. For example, each of the MC 1 110 and MC 2 112 may be in a physical block dedicated to the MC 1 110 and MC 2 112, respectively. Each power domain can have one or more operating voltages (or range of operating voltages) and is independent and separate from other power domains.

A power supply 200 is electrically coupled to the IC 100. The power supply 200 provides an operating voltage for each power domain on the IC 100. The power supply 200 can be attached to a same substrate and/or board as the IC 100, and can be electrically coupled to the IC 100 through the substrate and/or board, for example. The power supply 200 provides a first voltage V0 for the first power domain 202, a second voltage V1 for the second power domain 204, a third voltage V2 for the third power domain 206, a fourth voltage V3 for the fourth power domain 208, a fifth voltage V4 for the fifth power domain 210, a sixth voltage V5 for the sixth power domain 212. Any of the operating voltages V0, V1, V2, V3, V4, and V5 may be the same as or different from any of the other operating voltages V0, V1, V2, V3, V4, and V5.

The MU 116 together with master modules of the IC 100 can implement a power management framework based on a standard specification or a proprietary implementation. In some examples, the MU 116 and master modules implement a power management framework based on the Embedded Energy Management API specification (UG1200).

Components within master modules, such as components of the PS 102 like one or more processing units (PUs) within the PS 102, can self-initiate power modes and/or can be controlled by the MU 116 to be in a given one of power modes. For example, if a PU within the PS 102 is inactive for a predetermined period of time, the PU can send a message to the MU 116 requesting entry into a power down or suspended mode. Upon the MU 116 acknowledging the message, the PU enters into the power down or suspended mode. The MU 116 is then capable of waking up the PU.

Slave modules, such as the MC 1 110 and MC 2 112, can be controlled by the MU 116 alone and/or in conjunction with master modules to be in power modes. For example, the MU 116 can maintain a slave module in a powered off mode until a master module requests resources of the slave module. The MU 116 can then power on the slave module to permit the master module to access resources of the slave module. Upon the master module completing accessing the resources of the slave module, the MU 116 can cause the slave module to be powered off.

The MU 116 can also control power gating of components within various power domains. For example, the MU 116 can implement logic, such as in software and/or hardware, that can generate signals to control power gates to PUs of the PS 102, M/S Block 1 106, and/or M/S Block 2 108; memory blocks associated with PUs; configurable logic blocks of the PL 104; etc. depending on the use or instantiation of such components. If some configurable logic blocks of the PL 104 are not instantiated, for example, a power gate to those logic blocks can be opened to remove power to those logic blocks to reduce leakage and thereby reduce power consumption.

With each of the MC 1 110 and MC 2 112 being a separate physical block of the IC 100 (e.g., each not being included or disposed in or a part of a master module) and being in a power domain that is separate from and independent of power domains of each master module of the IC 100, the MC 1 110 and MC 2 112 can be operated in power modes independently of each master module and dependencies between master modules to use the MC 1 110 or MC 2 112 can be obviated. For example, if the PL 104 uses MC 1 110 to read to or write from memory and the PS 102 is in a power savings mode (e.g., powered down or off), the PL 104 can use the MC 1 110 to read to or write from memory without the PS 102 being powered up. Each master block or module in the IC 100 (e.g., the PS 102, PL 104, M/S Block 1 106, and M/S Block 2 108) can share one or both of the MC 1 110 and MC 2 112 without dependency between the master blocks or modules. In examples implementing a programmable NoC 122 as described herein, the NoC 122 may also be powered up and active for communications to be transmitted therethrough, such as between the master module and MC and between the MC and the memory (which may be off-chip).

FIG. 1 is an example implementation in the context of a programmable IC, which, e.g., includes programmable logic and/or programmable interconnects. Other implementations may be in the context of a non-programmable IC, such as a non-programmable ASIC. Some embodiments extend to, for example, any IC, such as a SoC, that includes a memory controller in a power domain separate or independent from other power domains of master modules.

Figure 2:
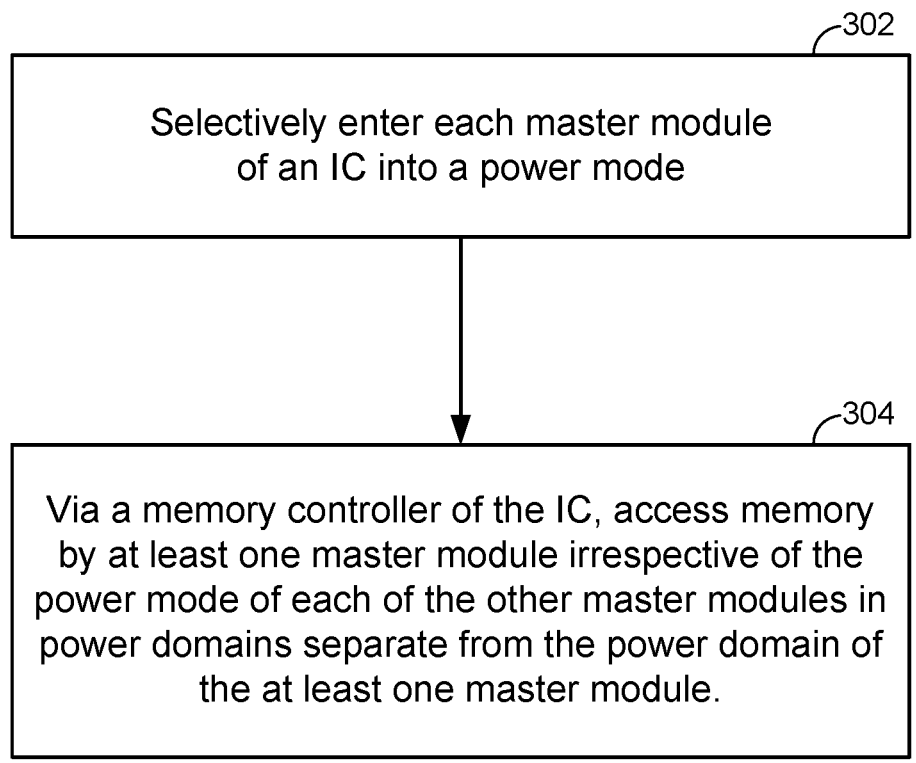
FIG. 2 is flowchart for power management and memory access in an IC, in accordance with some examples of the present disclosure.

FIG. 2 is flowchart for power management and memory access in an IC, in accordance with some examples of the present disclosure. The IC has multiple master modules, such as a processor system, programmable logic, accelerator, or another module. The IC further has a memory controller that the master modules may use to access memory, which memory may be on-chip or on a separate IC. The master modules are in one or more power domains on the IC (and in some instances, each master module is in a dedicated power domain separate from other domains of the other master modules), and the memory controller is in a power domain on the IC that is separate and independent from the one or more power domains in which the master modules are disposed. The memory controller is not included or disposed in a master module. For example, the memory controller can be in a physical block dedicated to the memory controller. Power modes of the master modules may be controlled, such as by a management unit coordinating with the master modules. Each master module can have different power modes, such as suspended mode, powered down mode, active mode, powered up, etc., into which the respective master module may be selectively entered based on the control of the master module.

At block 302, each master module of the IC is selectively entered into a power mode. At block 304, memory is accessed by at least one of the master modules, via the memory controller of the IC, irrespective of the power mode of each of the other master modules in power domain(s) separate from the power domain of the at least one master modules accessing the memory. Because the memory controller is in a power domain separate and independent from the power domains of the master modules, for example, a master module can access memory through the memory controller without bringing another master module (that is in a power domain different from the power domain of the master module accessing the memory) into an active or powered up mode if that other master module is in an inactive or powered down mode. Each of the master modules that are not in the power domain of the memory controller and not in the power domain of the master module accessing the memory may remain in its respective power mode regardless of the memory access.

An example IC for implementing the flowchart of FIG. 2 is illustrated in FIG. 1 and described above. Other ICs may also implement the flowchart of FIG. 2 and may have fewer, more, and/or different modules and/or power domains than described above with respect to FIG. 1 or with respect to FIG. 2.

Figure 3:
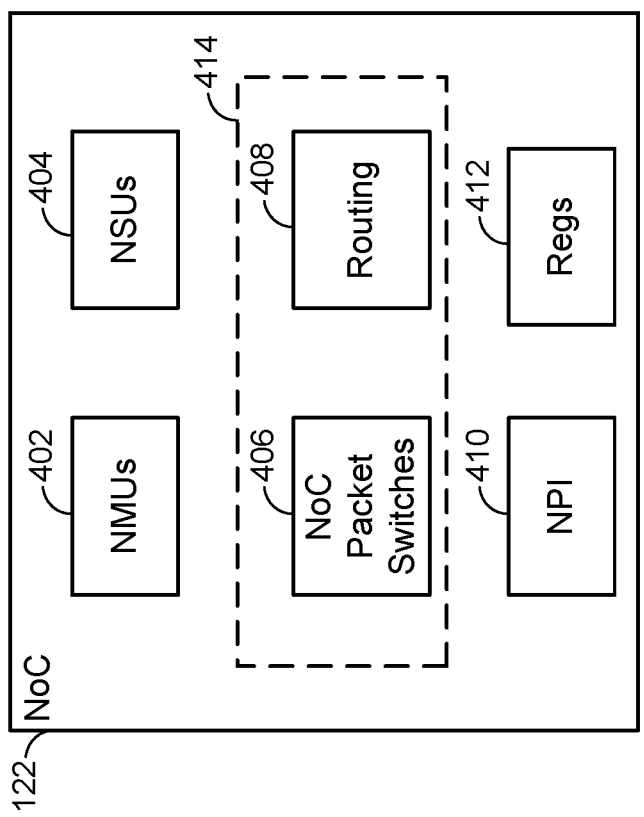
FIG. 3 is a block diagram depicting a network on a chip (NoC), in accordance with some examples of the present disclosure.

FIG. 3 is a block diagram depicting the NoC 122, in accordance with some examples of the present disclosure. The NoC 122 includes NoC master units (NMUs) 402, NoC slave units (NSUs) 404, a network 414, NoC peripheral interconnect (NPI) 410, and registers (Regs) 412. Each NMU 402 is an ingress circuit that connects a master endpoint circuit to the NoC 122. Each master endpoint circuit is in a master module. Each NSU 404 is an egress circuit that connects the NoC 122 to a slave endpoint circuit. Each slave endpoint circuit can be in slave module or a master module. A master module is capable of or configured to direct or control the operation of another module, such as a slave module. Under some circumstances, a master module can have its operation directed or controlled by another master module (e.g., can be a slave), and hence, a master module can include only master endpoint circuits or a combination of master endpoint circuits and slave endpoint circuits. A slave module has slave endpoint circuits.

The NMUs 402 are connected to the NSUs 404 through the network 414. In an example, the network 414 includes NoC packet switches 406 and routing 408 between the NoC packet switches 406. Each NoC packet switch 406 performs switching of NoC packets. The NoC packet switches 406 are connected to each other and to the NMUs 402 and NSUs 404 through the routing 408 to implement a plurality of physical channels. The NoC packet switches 406 also support multiple virtual channels per physical channel.

The NPI 410 includes circuitry to program the NMUs 402, NSUs 404, and NoC packet switches 406. For example, the NMUs 402, NSUs 404, and NoC packet switches 406 can include registers 412 that determine functionality thereof. For examples, the registers 412 can implement one or more routing tables for directing the switching functionality of the NoC packet switches 406. The NPI 410 includes an interconnect coupled to the registers 412 for programming thereof to set functionality. Configuration data for the NoC 122 can be stored in the memory (e.g., local memory and/or off-chip memory) and provided to the NPI 410 for programming the NoC 122.

The NoC 122 includes end-to-end Quality-of-Service (QoS) features for controlling data-flows therein. In examples, the NoC 122 first separates data-flows into designated traffic classes. Data-flows in the same traffic class can either share or have independent virtual or physical transmission paths. The QoS scheme applies two levels of priority across traffic classes. Within and across traffic classes, the NoC 122 applies a weighted arbitration scheme to shape the traffic flows and provide bandwidth and latency that meets the user requirements.

Figure 4:
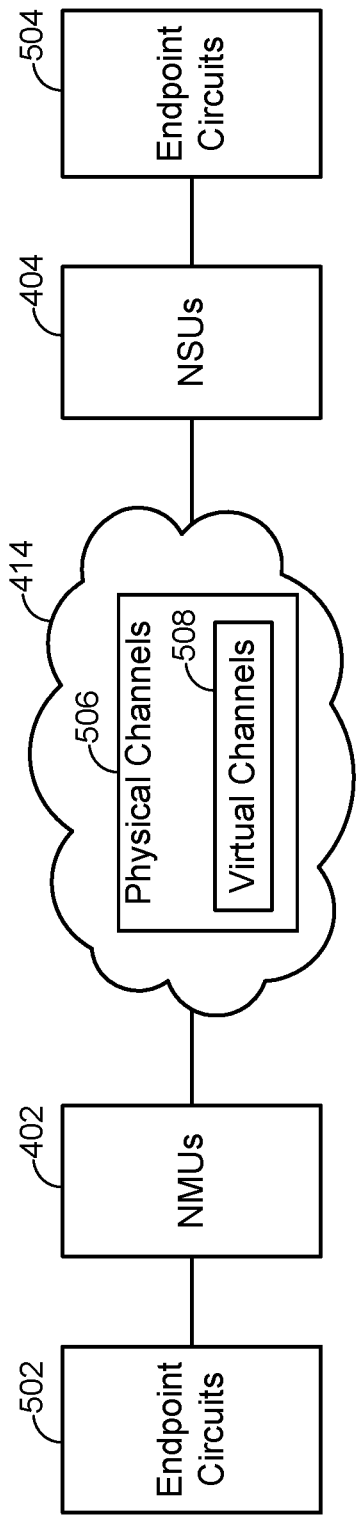
FIG. 4 is a block diagram depicting connections between endpoint circuits through a NoC, in accordance with some examples of the present disclosure.

FIG. 4 is a block diagram depicting connections between endpoint circuits through the NoC 122, in accordance with some examples of the present disclosure. In the example, endpoint circuits 502 are connected to endpoint circuits 504 through the NoC 122. The endpoint circuits 502 are master circuits, which are coupled to NMUs 402 of the NoC 122. The endpoint circuits 504 are slave circuits coupled to the NSUs 404 of the NoC 122. Each endpoint circuit 502 and 504 can be a circuit in the PS 102 or a circuit in the PL 104, for example, wherein one of the PS 102 and PL 104 can be a master to the other, which would be a slave, under appropriate circumstances. Each endpoint circuit in the PL 104 can be a dedicated circuit (e.g., a hardened circuit) or a circuit configured in programmable logic.

The network 414 includes a plurality of physical channels 506. The physical channels 506 are implemented by programming the NoC 122. Each physical channel 506 includes one or more NoC packet switches 406 and associated routing 408. An NMU 402 connects with an NSU 404 through at least one physical channel 506. A physical channel 506 can also have one or more virtual channels 508.

Figure 5:
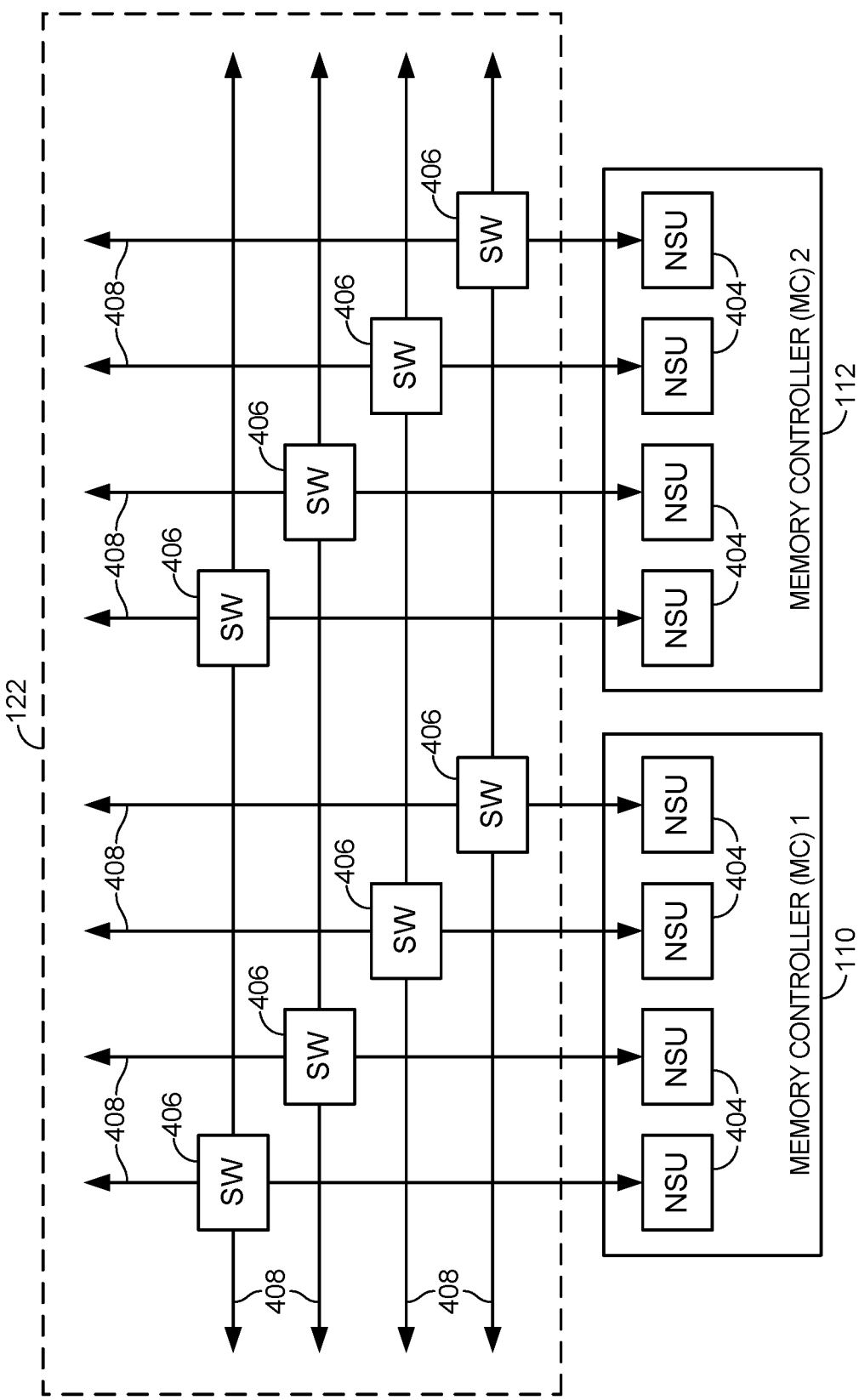
FIG. 5 is a block diagram of a portion of an IC including memory controllers with four ports connected to a NoC, in accordance with some examples of the present disclosure.

In some examples, the MC 1 110 and MC 2 112 each include multiple endpoint circuits, e.g., ports, such as four ports. Each of the endpoint circuits of the MC 1 110 and MC 2 112 connects with a respective NSU 404, and hence, each of the MC 1 110 and MC 2 112 connects to multiple, e.g., four, NSUs 404. FIG. 5 illustrates an example where each MC 1 110 and MC 2 112 includes endpoint circuits connected to four NSUs 404 to implement four ports. Each NSU 404 is connected to routing 408 of the NoC 122, which in turn is connected to various NoC packet switches 406 to communicatively couple the various NSUs 404 to master modules. By being connected via multiple NSUs 404 to the NoC 122, flexibility in source-to-destination routing and load balancing may be provided and achieved.

Further, in some examples, the MC 1 110 and MC 2 112 each support two traffic classes in separate virtual channels as described above for the NoC 122. This allows different traffic classes to share a physical NoC channel and port of the MC 1 110 or MC 2 112 without interference. Further, the multiple endpoint circuits, e.g., ports, of the MC 1 110 and MC 2 112 permit physical separation of different traffic classes for improved QoS.

In some implementations, one or more memory controllers can be present on an IC (e.g., SoC). Each memory controller can implement a separate memory channel. In some examples, access to each memory controller can be transparent to the master modules by configuring the NoC 122 to communicatively couple a master module to a respective memory controller. This can permit scalability in bandwidth and storage amount. By adding memory controllers that are transparent to the master modules, multiple memory channels can be implemented with comparable performance, such as bandwidth and latency.

Each of the multiple memory channels can occupy a separate contiguous address range, or the multiple memory channels can be interleaved to provide a single contiguous address space. In some examples, a mixed scheme may be implemented, wherein, for example, four memory channels are implemented having two pairs, with each pair occupying a separate address range but addresses are interleaved within each pair. The scheme implemented may be programmable via the NoC routing tables and can be transparent to the master modules. The MC 1 110 and MC 2 112 can support channel interleaving by ignoring address bits that may be used as channel select bits.

Channel interleaving may be useful, for example, when a bandwidth or storage amount for a given application exceeds the capacity of a single channel, and a user does not wish to directly manage allocation of resources across multiple channels. Channel interleaving can provide an automatic load balancing across the multiple channels without user intervention.

Having separate contiguous address ranges on separate memory channels can be useful when the user wishes explicit separation between tasks. For example, one channel may be used for time-sensitive or real-time data flow, such as video data, while another channel may be used for general purpose processing.

While the foregoing is directed to specific examples, other and further examples may be devised without departing from the basic scope thereof, and the scope thereof is determined by the claims that follow.

What is claimed is:
1. An integrated circuit comprising:
   master circuits on a chip, the master circuits including a processing system and programmable logic;
   a plurality of power domains on the chip;
   a configurable interconnect network on the chip in a power domain separate and independent from other power domains, wherein the interconnect network on the chip is configured for quality of service comprising multiple traffic classes enabled by applying a weighted arbitration scheme and applying multiple priority levels;

a first memory controller in a first power domain of the plurality of power domains on the chip;

a second memory controller in a second power domain of the plurality of power domains on the chip, wherein the processing system and the programmable logic are each configured to access memory via the first memory controller, the second memory controller, and the configurable interconnect network, wherein each master circuit on the chip that is configured to access the memory via a memory controller is in a power domain separate and independent from the power domain in which the memory controller is disposed, and wherein the first memory controller and the second memory controller are configured to interleave access to the memory.

2. The integrated circuit of claim 1, wherein a power domain in which a first master circuit of the master circuits is disposed is separate and independent from a power domain in which a second master circuit of the master circuits is disposed.

3. The integrated circuit of claim 1, wherein the first memory controller is not included in a master circuit.

4. The integrated circuit of claim 1, wherein the first memory controller is in a physical block dedicated to the first memory controller.

5. The integrated circuit of claim 1, wherein:
the first memory controller accesses a first address range of the memory;
the second memory controller accesses a second address range of the memory; and
the first address range is distinct from the second address range.

6. The integrated circuit of claim 1, wherein the first memory controller includes multiple ports connected to the configurable interconnect network.

7. The integrated circuit of claim 1, wherein the first memory controller is configured to enable handling multiple traffic classes via respective virtual channels of a physical channel of the configurable interconnect network.

8. An integrated circuit comprising:
a processing system on a chip;
programmable logic on the chip;
a plurality of power domains on the chip;
a configurable interconnect network on the chip in a power domain separate and independent from other power domains, wherein the configurable interconnect network on the chip is configured for quality of service comprising multiple traffic classes enabled by applying a weighted arbitration scheme and applying multiple priority levels;
a first memory controller on the chip in a power domain of the plurality of power domains;
a second memory controller in a power domain of the plurality of power domains on the chip, wherein the first memory controller and the second memory controller are configured to interleave access to the memory, the processing system and the programmable logic each being communicatively coupled to the first memory controller via the configurable interconnect network, the processing system and the programmable logic each being configured to access memory via the first memory controller, the second memory controller, and the configurable interconnect network; and
a management unit on the chip, the management unit being capable of controlling respective power modes of the processing system and the programmable logic independently of operation of the first memory controller.

9. The integrated circuit of claim 8, wherein:
the processing system is in a first power domain;
the programmable logic is in a second power domain separate and independent from the first power domain; and
the first memory controller is in a third power domain separate and independent from each of the first power domain and the second power domain.

10. The integrated circuit of claim 8, wherein the processing system and the programmable logic are each being communicatively coupled to the second memory controller via the configurable interconnect network, the management unit being capable of controlling respective power modes of the processing system and the programmable logic independently of operation of the second memory controller.

11. The integrated circuit of claim 8, wherein the first memory controller comprises multiple ports connected to the configurable interconnect network.

12. The integrated circuit of claim 8, wherein:
the configurable interconnect network is operable to implement a plurality of virtual channels on a physical channel; and
the first memory controller is configured to enable handling multiple traffic classes via respective ones of the plurality of virtual channels.

* * * * *